US010874056B2

(12) United States Patent
Garcia et al.

(10) Patent No.: US 10,874,056 B2
(45) Date of Patent: Dec. 29, 2020

(54) METHOD FOR PROPAGATION OF WOODY PLANTS FROM LEAF CUTTINGS

(71) Applicant: BIOTECNOLÓGICA EMPRESARIAL DEL SUR SPA, Talca (CL)

(72) Inventors: Rolando García, Talca (CL); Gabriela Vizcarra, Talca (CL)

(73) Assignee: BIOTECNOLOGICA EMPRESARIAL DEL SUR SPA, Talca (CL)

(*) Notice: Subject to any disclaimer, the term of this patent is extended or adjusted under 35 U.S.C. 154(b) by 243 days.

(21) Appl. No.: 15/778,357

(22) PCT Filed: Nov. 22, 2016

(86) PCT No.: PCT/IB2016/057039
§ 371 (c)(1),
(2) Date: May 23, 2018

(87) PCT Pub. No.: WO2017/089957
PCT Pub. Date: Jun. 1, 2017

(65) Prior Publication Data
US 2019/0246567 A1 Aug. 15, 2019

(30) Foreign Application Priority Data

Nov. 23, 2015 (CL) .................................. 03437-2015

(51) Int. Cl.
*A01G 2/00* (2018.01)
*A01G 2/10* (2018.01)
*A01G 17/00* (2006.01)
(52) U.S. Cl.
CPC ................. *A01G 2/10* (2018.02); *A01G 2/00* (2018.02); *A01G 17/005* (2013.01)

(58) Field of Classification Search
CPC .................................. A01G 2/00; A01G 2/10
(Continued)

(56) References Cited

U.S. PATENT DOCUMENTS 4,937,971 A * 7/1990 Collas ...................... A01G 2/30
47/6
5,119,588 A * 6/1992 Timmis .................... C12N 5/04
435/297.5

(Continued)

FOREIGN PATENT DOCUMENTS

AU     200138822 A1    11/2001
AU    2011244984 A1     5/2012
(Continued)

OTHER PUBLICATIONS

International Search Report (ISR) dated Apr. 3, 2017 for International Application No. PCT/IB2016/057039.
(Continued)

Primary Examiner — Richard T Price, Jr.
(74) Attorney, Agent, or Firm — Ladas & Parry LLP

(57) ABSTRACT

The presently claimed invention is related to a method for vegetative propagation of woody plants selected from the group consisting of *Eucalyptus* (*Eucalyptus* sp.), *Salix* sp., olive tree (*Olea europaea*), rootstock Atlas (*Prunus persica* x *Prunus dulcis* x *Prunus blireiana*), blueberries (*Vaccinum corymbosurn*), *Vitis vinifera*, *Aristotelia chilensis*, *Quillaja saponaria* and *Quercus ilex*, from prepared leaf cuttings, wherein the method comprises the steps of: a) providing cuts of leaf cuttings from a donor tree, b) immersing the prepared leaf cutting into a combination of growth regulators, c) planting the prepared leaf cutting into a solid substrate of organic and/or inorganic origin, d) inducing sprouting and rooting of the prepared leaf cutting, by means of controlled ambient temperature, humidity and illumination, wherein (Continued)

Figure 1:
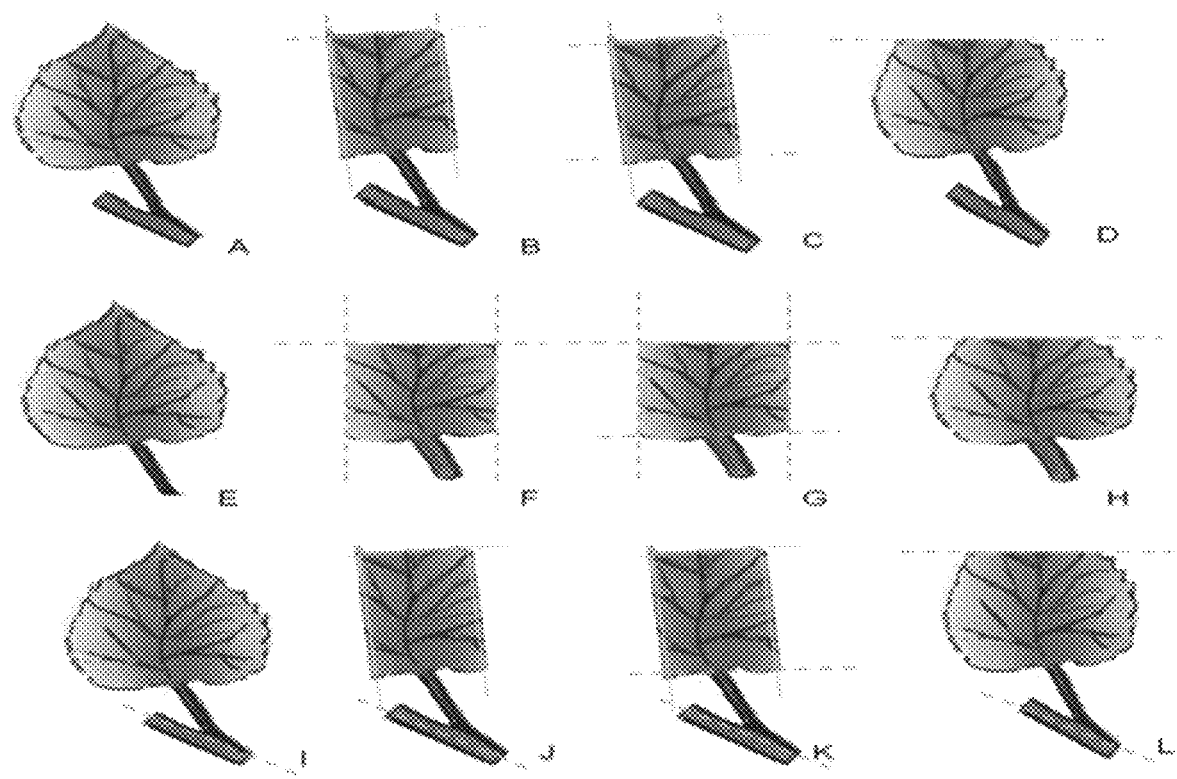

steps a) through d) always occur outside an in vitro environment; and embodiments thereof.

20 Claims, 8 Drawing Sheets

(58) Field of Classification Search
USPC ........................................ 47/58.1 R, 58.1 SC
See application file for complete search history.

(56) References Cited

U.S. PATENT DOCUMENTS

| | | | | |
|---|---|---|---|---|
| 5,581,936 | A | * | 12/1996 | Belgiorno .............. A01G 9/029 47/65.5 |
| 5,584,140 | A | * | 12/1996 | Byrne ...................... A01G 7/00 47/58.1 R |
| 6,336,291 | B1 | * | 1/2002 | Skuba .................... A01G 20/20 47/58.1 R |
| 6,792,715 | B2 | * | 9/2004 | Smidstrup Damgaard Pedersen .................. A01G 2/30 47/58.1 R |
| 7,308,775 | B1 | * | 12/2007 | Lovelace .............. A01G 23/00 47/58.1 R |
| 7,607,259 | B2 | * | 10/2009 | Savich ................... A01G 24/00 47/58.1 R |
| 7,966,767 | B2 | * | 6/2011 | Perriello .............. A01C 23/025 47/58.1 R |
| 2005/0120623 | A1 | | 6/2005 | Herman |

FOREIGN PATENT DOCUMENTS

| | | |
|---|---|---|
| CN | 1232167 A | 10/1999 |
| CN | 1552196 A | 12/2004 |
| CN | 1973616 A | 6/2007 |
| CN | 102388736 A | 3/2012 |
| GB | 2425530 A | 11/2006 |

OTHER PUBLICATIONS

Written Opinion (WO) dated Apr. 3, 2017 for International Application No. PCT/IB2016/057039.
Documents Descriptions.
Grant Amy: Propagating Encalyptus: HowTo Grow Eucalyptus From Seed Or Cuttings: Gardening Know How: Apr. 26, 2015: (Apr. 26, 2015): XP002768770: Retrieved from the Internet: URL:https://web.archive.org/web/20150426003751/http://www.Gardeningknowhow.com/ornamental/trees/eucalyptus/propagating/eucalyptus-plants.htm: [retreived on Mar. 30, 2017] Section Starting Eucalyptus Trees from Cuttings.
Hanan J J. et al: "Chapter 9: Insect and Disease Control": In: "Advanced Series in Agricultural Sciences—Greenhouse Management": Jan. 1, 1978 (Jan. 1, 1978): Springer, Berlin, XP002768771, ISBN: 978-3-642-66780-0: vol. 5: p. 380.
Hananah Jaenicke, et al.: Vegetative Tree Propagation in Agroforestry, Training Guidelines and References: Edited by Hannah Jaenicke and Jan Beniest: © ICRAF 2002: pp. 1-150.
Nancy Toenyan, et al.: Cutting Propagation Methods for PNW Native Shrubs and Trees: pp. 1-12.
Dr. Sharon M. Douglas: Basic techniques for propagating plants: The Connecticut Agicultural Experiment Station: Jun. 2008 (revised): pp. 1-7.
M. Navarrete-Luna, et al.: Spanish document entitled Propagation asexual de clones de Eucaliptus [Asexual propagation of Eucalyptus clones]: Revista Chapingo Serie Ciencias Forestales y del Ambiente 11(2):111-116, 2005.
H. Chaperone: Clonal Propagation of Eucalyptus by Cuttings in France: Gen. Tech. Rep. PSW-69, Berkeley, CA: Pacific Southwest Forest and Range Experiment Station, Forest Service, U.S. Department of Agriculture: 1983: pp. 108-114.
Miranda Titon, et al.: Clonal propagation of Eucalyptus grandis using the mini-cutting and micro-cutting techniques: Scientia Forestalis: No. 71: Aug. 2006: pp. 109-117.
Teotoonio Francisco de Assis, et al.: Current techniques and prospects for the clonal propagation of hardwoods with emphasis on Eucalyptus: Research Signpost: Plantation Forest Biotechnology for the 21st Century, 2004: 303-333 ISBN: 81-7736-228-3: pp. 303-333.
Hudson_T_Hartmann et al.: Plant Propagation: Principles and Practices: Six Edition (Nov. 6, 1996): ISBN-13: 978-0132061032.
Search Report issue in corresponding Brazil Patent Application BR112018010459-0.
Search Report issued in corresponding China Patent Application 2016800799558.
Machine English translation of the Abstract for CN102388736.
Machine English translation of the Abstract for CN1552196.
Machine English translation of the Abstract for CN1232167.
Machine English translation of the Abstract for CN1973616.

* cited by examiner

METHOD FOR PROPAGATION OF WOODY PLANTS FROM LEAF CUTTINGS

RELATED APPLICATION

This application is a national phase entry under 35 USC 371 of International Patent Application No.: PCT/IB2016/057039 filed on 22 Nov. 2016, which claims priority from Chilean Application No. 03437-2015 filed on 23 Nov. 2015, the entire contents of which are incorporated herein by reference

FIELD OF THE INVENTION

The presently claimed invention is related to a new technology for vegetative propagation of woody plants, wherein it has been preferably found that this technology is useful in forestry and agriculture, using leaf cuttings prepared to such purpose.

I. AIM OF THE INVENTION

The present application refers to a novel method for in vivo propagation of woody plants from leaf cuttings and under greenhouse conditions. The method is based on the handling of plant growth regulators (PGR), the environmental growth conditions of the plant, as well as the selection and preparation of the cuttings, allowing reaching the totipotent expression of the plant cell and obtaining plants, according to the invention. Even though leaves are abundant in trees and woody shrubs, they are not generally used as plant propagation material, since the more frequent methods for asexual propagation use buds, cuttings, grafts, roots and mini-cuttings as plant material.

The state of the art does not provide massive protocols for commercial use of in vivo propagation, allowing propagating woody species, and using leaf cuttings as a method. Moreover, the use of leaves has been limited in the past to propagate herbaceous plants, especially for ornamental use, and to propagate plants under specific conditions, using in vitro technologies.

There is a need to develop new propagation technologies that allow the successful in vivo propagation of woody species from leaves. The methodology proposed in the presently claimed invention based on the use of leaf cuttings is a plausible solution to meet this need.

Introduction

In terms of plant propagation, turning to sexual reproduction may be counterproductive, especially when the aim is to ensure the permanence of specific features of interest present in some individuals of a population. Thus, the use of seeds is no longer a viable alternative, and it is necessary to implement vegetative or asexual (clonal) propagation or reproduction methodologies. The main techniques used to date are: propagation by cuttings or other propagules, and in vitro culture (with the different variants); each having advantages and disadvantages depending on the aim to be achieved.

In the particular case of in vitro culture, this technique is conventionally used when the classic in vivo propagation methods are insufficient for the productive needs (slow response, limitation given by the amount of plant material available for propagation); however, the technology required for such purposes is relatively complex, and its costs are high. Therefore, this technique is less required and reserved only for particular cases.

In the current production scenario, and with increasing frequency, in the forestry and fruticulture fields, the clonal culture has been selected for use, thereby establishing monoclonal plantations in order to obtain homogeneity in yields and in the productive practices which must be carried out during the establishment and development of plantations.

Developing clonal plantations requires a good availability of reproductive material; hence, asexual propagation is applied by different techniques. Propagation by cuttings is one of the most widely extended methods; however, it may have technological barriers preventing it from being widespread, due to either the poor availability of the propagation material or the physiological response of the species.

In the case of establishing clonal plantations for different purposes, vegetative propagation is a reality applied to forest species of great importance, such as pine and *eucalyptus*. Nevertheless, in some species this forestry practice can be limited due to the difficulty of commercial propagation through clonal techniques. For instance, some hybrids from *Eucalyptus* spp. have very low rooting and sprouting rates. In an embodiment, the presently claimed invention shows successful methodologies for in vivo propagation of *Eucalyptus* spp. leaf cuttings.

For *salicaceae*, although leaves are abundant in trees, they are not used as propagation material. For these species, the more common propagation methods are based on the use of hardwood and semi-hardwood cuttings, stem cuttings or grafts. According to the data available, there is no massively used technology for propagation of *salicaceae* trees by means of leaf cuttings under in vivo conditions, since using this type of tissues for such species has been limited only to in vitro culture. In another embodiment, the presently claimed invention demonstrates a methodology for using leaf cuttings in in vivo propagation of two species from the genus *Salix*.

In the case of establishing plantations of woody fruit trees, plant propagation is used for different species of great interest. However, in some species this practice is limited due to the difficulty of commercial propagation through clonal techniques. In the case of woody fruit trees, in further embodiments the presently claimed invention has the application of a leaf cutting propagation method in two species of woody trees, namely olive trees (*Olea europaea*), and the widely used rootstock Atlas (*Prunus persica* x *Prunus dulcis* x *Prunus blireiana*), which have been reported as being very difficult to propagate through in vivo or in vitro technologies.

The method proposed by the presently claimed invention is supported by the totipotentiality of plant cells. This invention demonstrates the feasibility of developing full plants based on the culture of leaves and leaf segments, prepared as cuttings, treated with growth regulators, and maintained under controlled conditions of temperature, moisture and substrates in greenhouse conditions.

Moreover, the presently claimed invention has diverse advantages over the aforementioned vegetative propagation methodologies: it is easy to develop, being a very massive method, genetically stable and having a very relevant quality when applied to deciduous species, namely it allows producing material the whole year. Another advantage is that it has very good rates of rooting, sprouting and survival, even higher than the conventional in vitro and in vivo techniques for some woody species. Furthermore, its implementation is quick and low-cost.

II. BACKGROUND OF THE INVENTION

State of the Art

Document AU 2011244984 discloses a method for producing rooted cuttings of genus *Eucalyptus* from a mother tree having a height of 100 cm, using cuttings, whose diameter are 1.8-5 mm, and it further uses a PGR, allowing the cuttings to be rooted. The propagation is carried out in a cultivation soil.

Document AU 200138822 discloses a plant cutting selected from genus *Eucalyptus* and genus *Acacia*, obtained by immersing a cutting obtained from the mother tree in an aqueous solution of aluminum salts. The cuttings are planted in soil to allow them to root. It also discloses the method for obtaining the cutting. None of these documents refers to leaf cuttings as propagation means.

The document entitled: "Vegetative Tree Propagation in Agroforestry, Training Guidelines and References" refers to different technologies for propagating trees. Different chapters provide technical recommendations for propagating and maintaining trees during propagation. The book is relevant, since it focuses on the more common propagation practices for woody species. In the practice, this book is considered as a FAO's Practical Guide. Although the book describes very well the different types of cuttings used in the industry, it does not mention or address the use of leaf cuttings in the commercial production of seedlings.

The document entitled "Cutting Propagation Methods for PNW Native Shrubs and Trees" emphasizes that the ability of plants to grow from any tissue segment is related to their ability to heal and interact with different environmental conditions. It further states that the natural balance of plant hormones can affect the ability of tissues to survive and form a new plant. Similarly, it is indicated that callus production in wounded areas is critical and that the same hormones related to callus formation are directly related to rooting.

The document entitled "Basic techniques for propagating plants" explains some techniques for the vegetative propagation of plants. It points out that plants propagated by these methods have the same characteristics as donor plants, since vegetative material is used and genetic recombination is not involved. The authors state that leaf cuttings are used in some plant species with specific characteristics, but they do not refer to woody plants.

The Spanish document entitled "Propagación asexual de clones de *Eucaliptus*" [Asexual propagation of *Eucalyptus* clones] shows various results of propagation of *Eucalyptus* by cuttings. The authors found no effect in relation to treatments with IBA (Indole Butyric Acid). However, they found possible effects of the genotypes and the season to collect the samples. The authors do not mention the use of leaf cuttings.

The document entitled "Clonal Propagation of *Eucalyptus* by Cuttings in France" provides a complete description of the asexual propagation in *Eucalyptus* by the use of cuttings. It is noteworthy that the authors find a significant effect of the season on the selection, and preparation of the stakes on the efficiency. The use of plant growth regulators is highly recommended and the authors do not refer to the use of leaf cuttings.

The document entitled "Clonal propagation of *Eucalyptus grandis* using the mini-cutting and micro-cutting techniques" discloses the asexual propagation of *E. grandis* through mini and micro-cuttings. The microclonal technique is based on the propagation of microgreens from in vitro culture, while the mini-cuttings consist of microgreens produced in a conventional manner. The authors found that micro-cuttings had a better overall behavior for the variables survival, rooting, vigor, survival in shade, height, and root neck. However, for the clones with low rooting none of the two procedures efficiently induced roots. Leaf cuttings were not used in this study.

The document entitled "Current techniques and prospects for the clonal propagation of hardwoods with emphasis on *Eucalyptus*" describes the massive plant propagation of seedlings in forestry operations. In general, it is based on applications for timber species, more specifically for *Eucalyptus*, where the main limitations are described in detail.

The book "Plant Propagation: Principles and Practices", edited by Hartmann et al., discloses the basic principles that support the use of leaf cuttings with or without buds. This document is very important because it states in different parts that it is very difficult to propagate from this plant material. However, it is also indicated that this type of cutting is very important when there is not enough propagation material available. It is also interesting that in this document this type of plant material is never recommended for propagating woody species.

III. SUMMARY OF THE INVENTION

The presently claimed invention addresses the development of a new technology for the in vivo propagation of woody trees.

In one embodiment of the invention, a tree propagation methodology is presented for multiplying *Eucalyptus* spp. Other embodiments of the invention use the new in vivo propagation technology to reproduce *Salix* species, olive trees and rootstocks Atlas among others, using leaf tissues as donors.

On the other hand, *Eucalyptus* spp. was also chosen not only considering its commercial importance as a woody tree, but also because it represents a challenge from the point of view of the difficulty to propagate some relevant genotypes of *Eucalyptus* spp. that are very important in the industry.

In the presently claimed invention leaf tissues from shoots developed during the growing season (spring and summer) were collected from donor trees, as expressed in the embodiments that address *Eucalyptus* spp., *Salix* sp., olive trees and the rootstock Atlas. The tissues were collected and stored in a humid chamber to be transported to the nursery. Once in the greenhouse, the expanded leaves were cut from the shoot and were inoculated for 30 minutes in an aqueous solution containing different concentrations of plant growth regulators (PGRs).

After being treated with growth regulators, the leaves were planted in a warm bed for 60 days to induce sprouting and rooting. The substrate temperature was adjusted to 24° C. for all treatments and irrigation was performed with a MIST system, maintaining greenhouse humidity above 85%. The efficiency of the propagation system was evaluated, as well as propagation with naked root and covered root in containers of 100 cc.

For all species the production of plants was evaluated in different types of organic and inorganic substrates: pine sawdust, sand, peat, perlite, vermiculite. In parallel, the use of a hydroponic system for propagating from the mentioned leaf cuttings was evaluated.

On average, callus formation was observed two or three weeks after planting the leaf cuttings into warm beds in almost all treatments. Meanwhile, root formation took place between the fourth and fifth weeks of cultivation. The regeneration of the whole plant was visible between 45 and 60 days after planting, depending on the plant species or genotype.

Plant propagation was possible in all substrates evaluated, although it may vary from one substrate to another, depending on the species and the genotype.

In the case of *Salix* sp., each leaf was capable of forming between 2 and 3 plants per leaf and the rest of the evaluated species formed 1 plant per leaf cutting.

The propagation of plants by technology based on leaf cuttings was possible both on bare root and in containers. It is the first time that leaf cuttings show levels of efficiency that allow their use on a commercial scale. It is claimed for all species tested that according to our data, it is the first time that leaf cuttings have been an inventive method of propagation with respect to traditional hardwood cuttings, grafts, seeds and other forms of propagation.

IV. BRIEF DESCRIPTION OF THE DRAWINGS

FIG. 1. Schematic representation diagram of the different types of cuts made to the leaves for the preparation of the cuttings. A-D) Leaf cuttings welded to the stem with bud; E-H) Leaf cuttings welded to the stem with bud and longitudinal cut of the stem. The leaf presented in the drawing is generic and does not correspond to a particular species.

Figure 2:
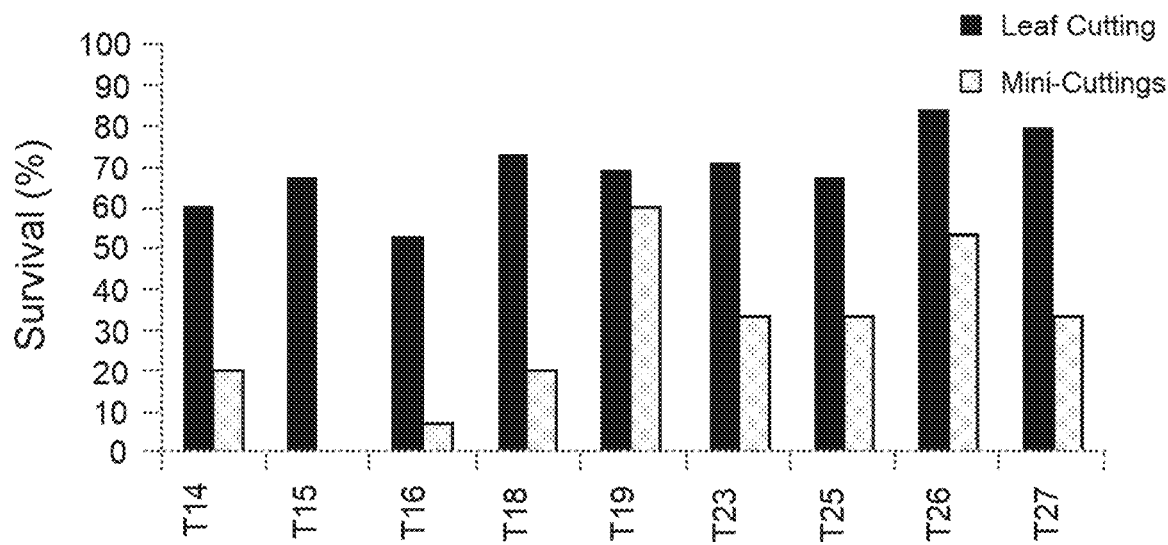

FIG. 2. Survival of welded *Eucalyptus* leaf cuttings subjected to different growth regulator treatments. Treatments: T14=Zea (5 mgL$^{-1}$); T15=BAP (5 mgL$^{-1}$); T16=IBA (1 mgL$^{-1}$); T18=IBA (1 mgL$^{-1}$)+Zea (5 mgL$^{-1}$); T19=IBA (1 mgL$^{-1}$)+BAP (5 mgL$^{-1}$); T23=IBA (4 mgL$^{-1}$)+BAP (5 mgL$^{-1}$); T24=IBA (8 mgL$^{-1}$); T26=IBA (8 mgL$^{-1}$)+Zea (5 mgL$^{-1}$); T27=IBA (8 mgL$^{-1}$)+BAP (5 mgL$^{-1}$).

Figure 3:
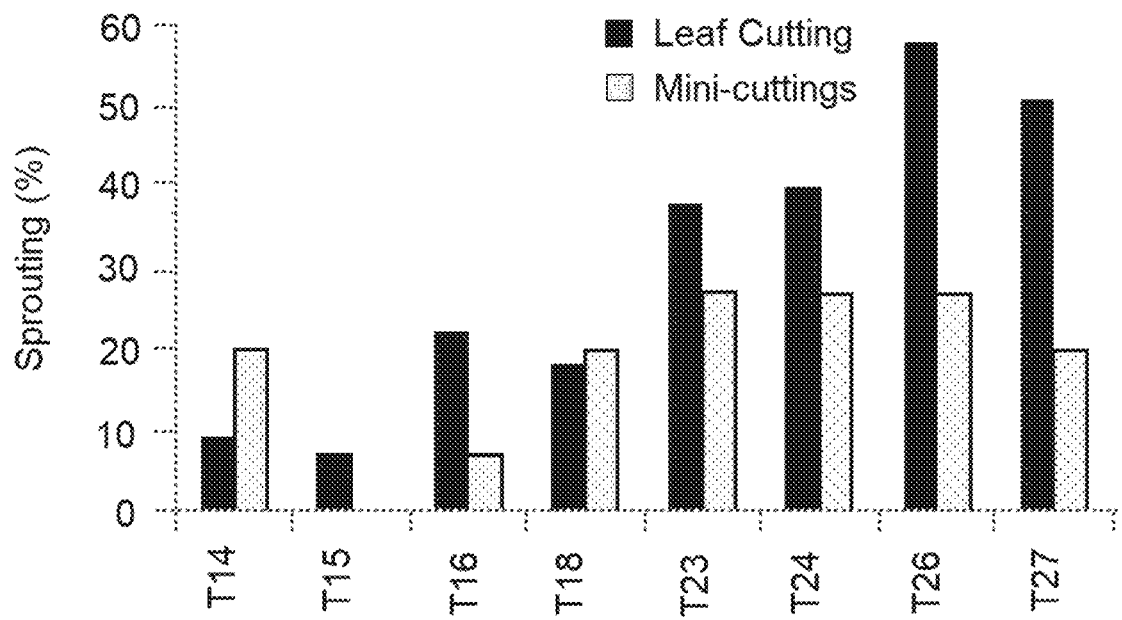

FIG. 3. Sprouting of welded *Eucalyptus* leaf cuttings subjected to different growth regulator treatments in two types of plant production systems. Treatments: T14=Zea (5 mgL$^{-1}$); T15=BAP (5 mgL$^{-1}$); T16=IBA (1 mgL$^{-1}$); T18=IBA (1 mgL$^{-1}$)+Zea (5 mgL$^{-1}$); T23=IBA (4 mgL$^{-1}$)+BAP (5 mgL$^{-1}$); T24=IBA (8 mgL$^{-1}$); T26=IBA (8 mgL$^{-1}$)+Zea (5 mgL$^{-1}$); T27=IBA (8 mgL$^{-1}$)+BAP (5 mgL$^{-1}$).

Figure 4:
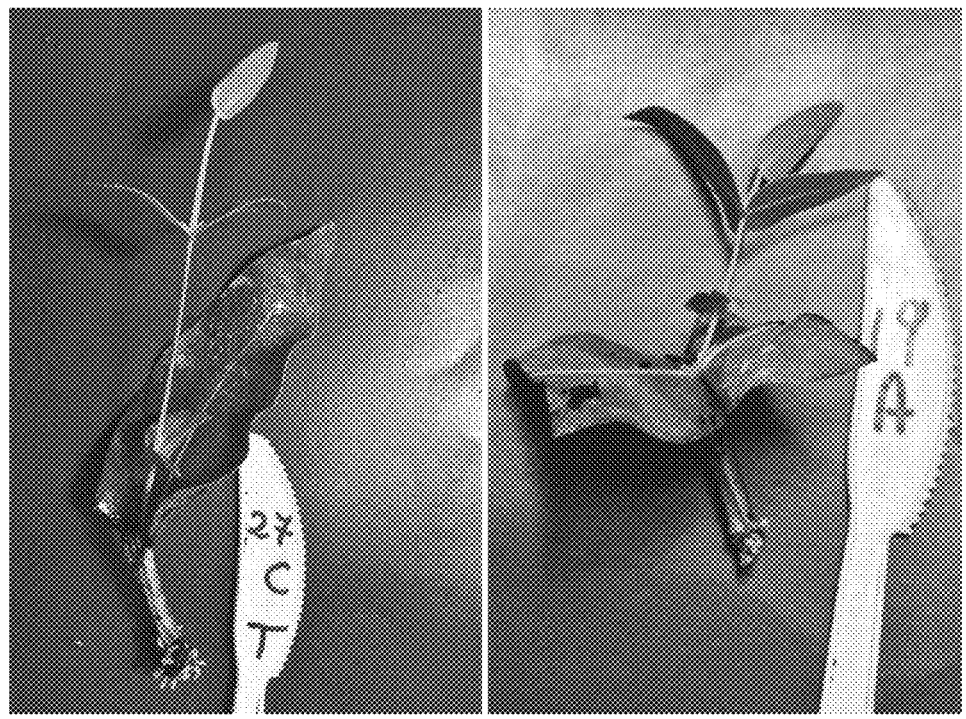

FIG. 4. Height of the *Eucalyptus* shoot in leaf cuttings (left) and mini-cuttings (right) at 60 days of planting.

Figure 5:
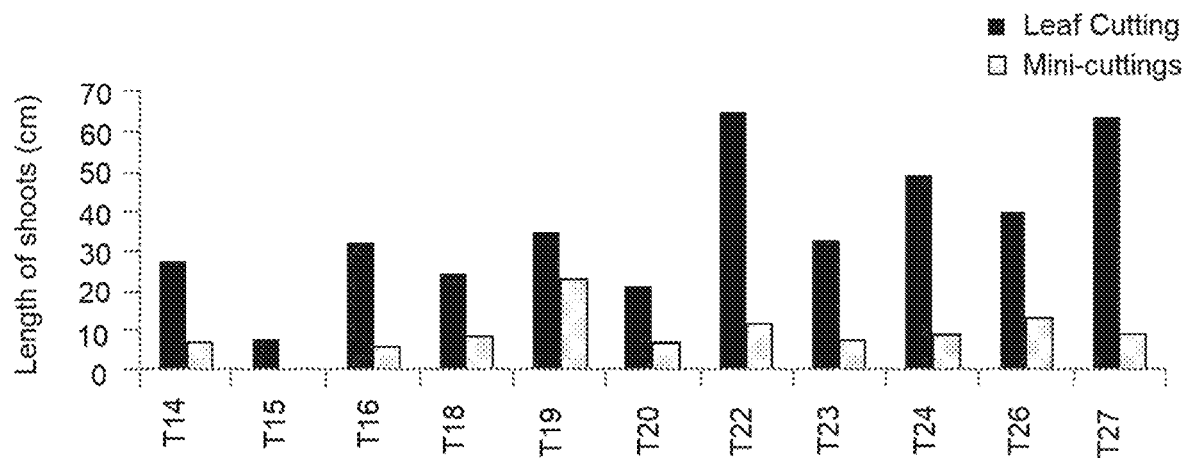

FIG. 5. Height of *Eucalyptus* shoots from welded leaf cuttings subjected to different growth regulator treatments in two types of plant production systems. Treatments: T14=Zea (5 mgL$^{-1}$); T15=BAP (5 mgL$^{-1}$); T16=IBA (1 mgL$^{-1}$); T18=IBA (1 mgL$^{-1}$)+Zea (5 mgL$^{-1}$); T19=IBA (1 mgL$^{-1}$)+BAP (5 mgL$^{-1}$); T20=IBA (4 mgL$^{-1}$); T22=IBA (4 mgL$^{-1}$)+Zea (5 mgL$^{-1}$); T23=IBA (4 mgL$^{-1}$)+BAP (5 mgL$^{-1}$); T24=IBA (8 mgL$^{-1}$); T26=IBA (8 mgL$^{-1}$)+Zea (5 mgL$^{-1}$); T27=IBA (8 mgL$^{-1}$)+BAP (5 mgL$^{-1}$).

Figure 6:
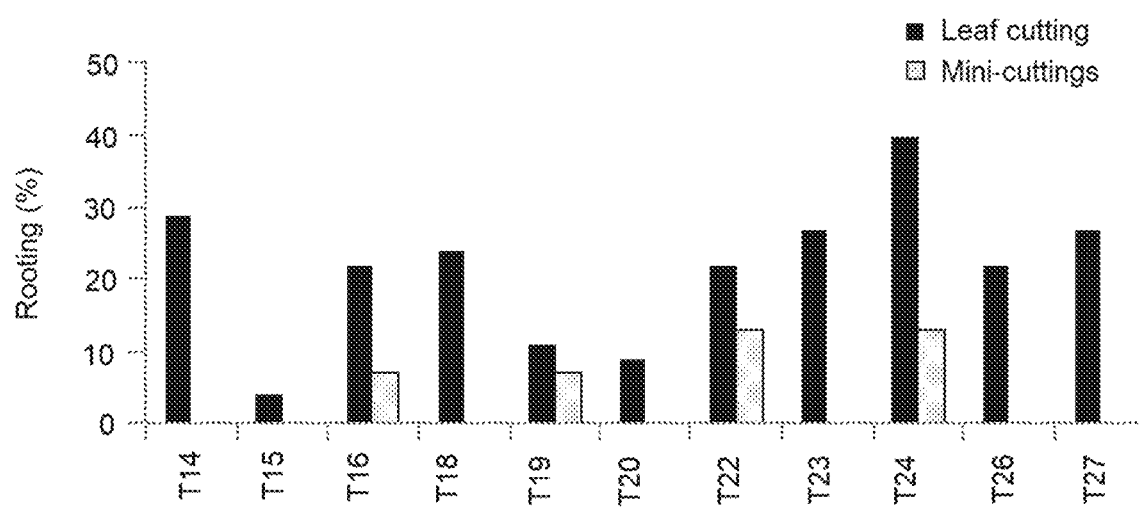

FIG. 6. Rooting of welded *Eucalyptus* leaf cuttings subjected to different growth regulator treatments. Treatments: T14=Zea (5 mgL$^{-1}$); T15=BAP (5 mgL$^{-1}$); T16=IBA (1 mgL$^{-1}$); T18=IBA (1 mgL$^{-1}$)+Zea (5 mgL$^{-1}$); T19=IBA (1 mgL$^{-1}$)+BAP (5 mgL$^{-1}$); T20=IBA (4 mgL$^{-1}$); T22=IBA (4 mgL$^{-1}$)+Zea (5 mgL$^{-1}$); T23=IBA (4 mgL$^{-1}$)+BAP (5 mgL$^{-1}$); T24=IBA (8 mgL$^{-1}$); T26=IBA (8 mgL$^{-1}$)+Zea (5 mgL$^{-1}$); T27=IBA (8 mgL$^{-1}$)+BAP (5 mgL$^{-1}$).

Figure 7:
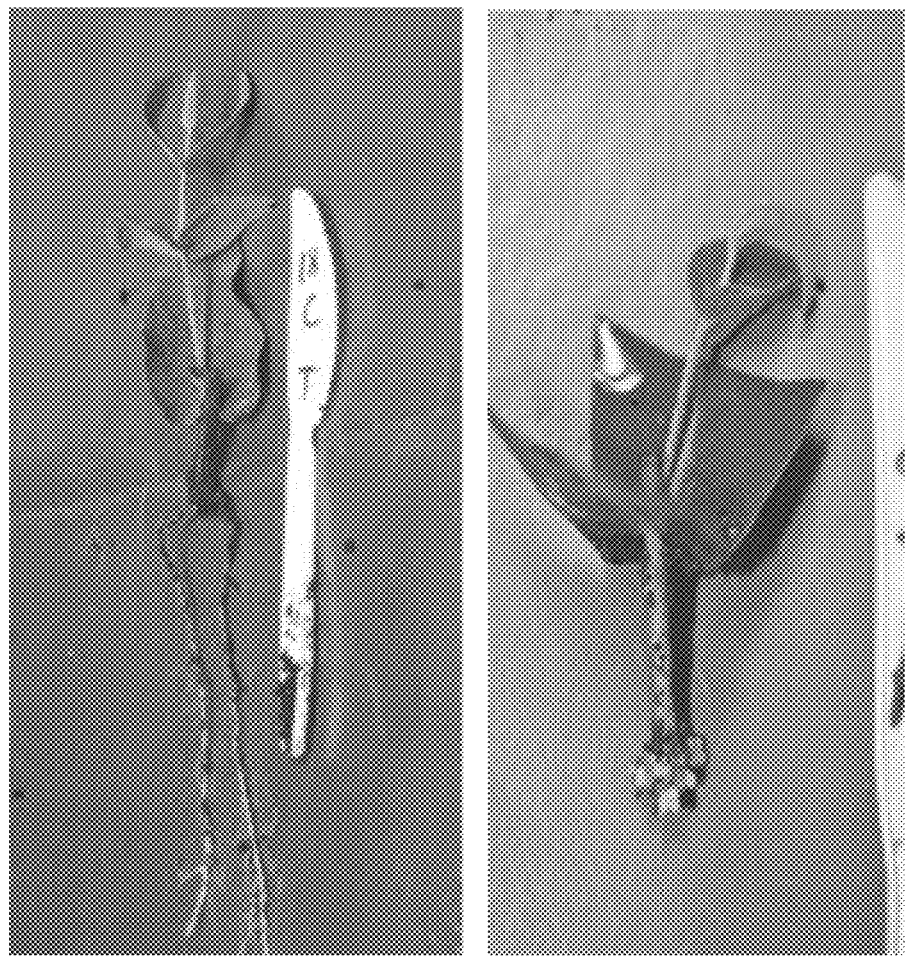

FIG. 7. Rooting and root development of *Eucalyptus* from welded leaf cuttings and mini-cuttings at 60 days of plants.

Figure 8:

FIG. 8. Formation of shoots in *Salix humboltiana*, at 30 days of planting the leaf cutting.

Figure 9:
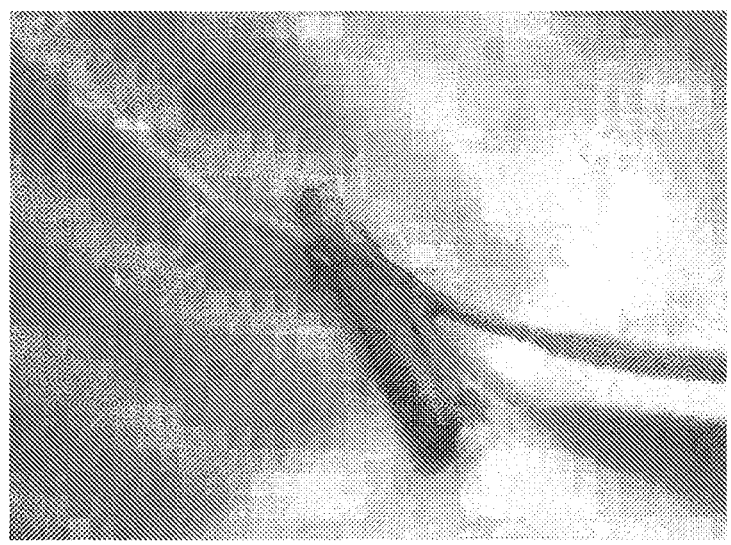

FIG. 9. Root formation in *Salix humboltiana*, at 30 days of planting the leaf cutting.

Figure 10:
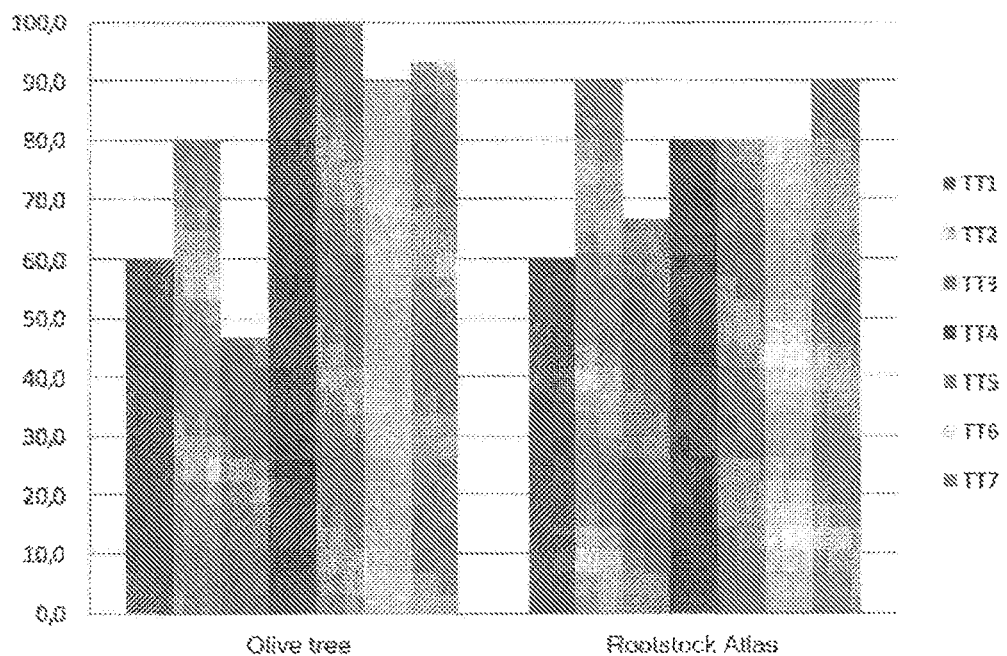

FIG. 10. Survival of leaf cuttings from olive trees and rootstocks Atlas in different hormonal treatments Treatment 1 (TT1=5 mgL$^{-1}$ of 6-BAP); Treatment 2 (TT2=5 mgL$^{-1}$ of IBA+5 mgL$^{-1}$ of 6-BAP); Treatment 3 (TT3=4 mgL$^{-1}$ of 6-BAP); Treatment 4 (TT4=4 mgL$^{-1}$ of IBA+5 mgL$^{-1}$ of Zeatin); Treatment 5 (TT5=4 mgL$^{-1}$ of IBA+5 mgL$^{-1}$ of 6-BAP); Treatment 6 (TT6=8 mgL$^{-1}$ of IBA+5 mgL$^{-1}$ of Zeatin); Treatment 7 (TT7=8 mgL$^{-1}$ of IBA+5 mgL$^{-1}$ of BAP).

Figure 11:
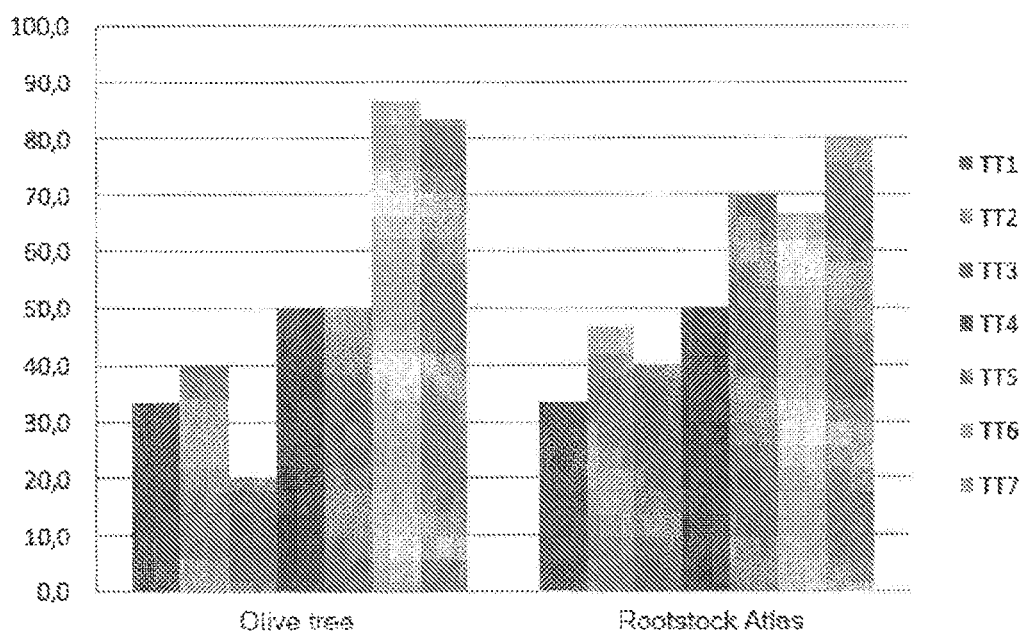

FIG. 11. Sprouting of leaf cuttings from olive trees and rootstocks Atlas in different hormonal treatments: Treatment 1 (TT1=5 mgL$^{-1}$ of 6-BAP); Treatment 2 (TT2=5 mgL$^{-1}$ of IBA+5 mgL$^{-1}$ of 6-BAP); Treatment 3 (TT3=4 mgL$^{-1}$ of 6-BAP); Treatment 4 (TT4=4 mgL$^{-1}$ of IBA+5 mgL$^{-1}$ of Zeatin); Treatment 5 (TT5=4 mgL$^{-1}$ of IBA+5 mgL$^{-1}$ of 6-BAP); Treatment 6 (TT6=8 mgL$^{-1}$ of IBA+5 mgL$^{-1}$ of Zeatin); Treatment 7 (TT7=8 mgL$^{-1}$ of IBA+5 mgL$^{-1}$ of BAP).

Figure 12:
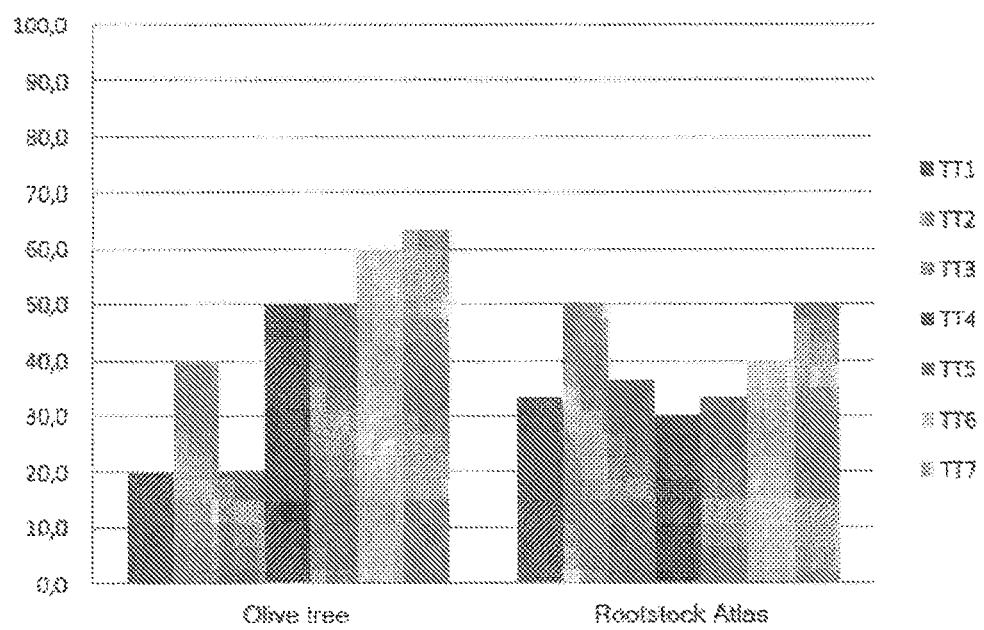

FIG. 12. Rooting of leaf cuttings from olive trees and rootstocks Atlas in different hormonal treatments Treatment 1 (TT1=5 mgL$^{-1}$ of 6-BAP); Treatment 2 (TT2=5 mgL$^{-1}$ of IBA+5 mgL$^{-1}$ of 6-BAP); Treatment 3 (TT3=4 mgL$^{-1}$ of 6-BAP); Treatment 4 (TT4=4 mgL$^{-1}$ of IBA+5 mgL$^{-1}$ of Zeatin); Treatment 5 (TT5=4 mgL$^{-1}$ of IBA+5 mgL$^{-1}$ of 6-BAP); Treatment 6 (TT6=8 mgL$^{-1}$ of IBA+5 mgL$^{-1}$ of Zeatin); Treatment 7 (TT7=8 mgL$^{-1}$ of IBA+5 mgL$^{-1}$ of BAP).

V. DETAILED DESCRIPTION OF THE INVENTION

In the presently claimed invention it will be understood that the steps of the defined culture conditions which always occur outside an in vitro environment are represented by a crop under greenhouse conditions, a crop under hydroponic conditions, or an outdoor crop.

Selection of Plant Material

1. The present technology is useful for propagating adult trees, hedges, shrubs, small mother plants and nursery plants.

2. For any of the evaluated species, the selection of the donor branches is carried out considering phenological age, favoring branches of the season, with little lignification. However, adult branches can be used as donors, if necessary and depending on the species under study.

3. The cuttings are prepared from petiolated or welded leaves.

4. The cuttings are cut and kept in a chilled and humid chamber, where they are transported to their destination.

Preparation of the Cutting

5. The preparation of the cutting may depend on the species, type of leaf, phenological age of the branch and the leaves. The cuttings can be prepared as shown in FIG. 1.

6. For cuttings of opposite leaves, a longitudinal cut is made between the two leaves, dividing the stem into two cuttings.

7. The above preparation is made for both welded leaf cuttings and for elongated petiole cuttings.

8. The (non-petiolated) leaf cuttings with bud and having alternate or opposite leaves are prepared leaving a section of stem between 0.5 and 3 cm above and below the bud, depending on the type of cutting, phenological age and species.

9. Once prepared, the cuttings are immersed into an aqueous solution containing growth regulators containing auxins (AIA, ANA or IBA, indistinctly) or cytokinins (BAP, TDZ, ZEA, KIN, 2-iP, indistinctly) or the mixture of auxins and cytokinins (AIA+BAP or AIA+TDZ or AIA+ZEA or AIA+KIN, ANA+BAP or ANA+TDZ or ANA+ZEA or ANA+KIN, IBA+BAP or IBA+TDZ or IBA+ZEA or IBA+KIN or IBA+2-iP or BAP+2iP) in a concentration range of 0 mgL$^{-1}$ to 10 mgL$^{-1}$ of each growth regulator, either simply added or mixed. For example, the concentration of the regulator may be selected from 1, 1.5, 2, 2.5, 3, 3.5, 4, 4.5, 5, 5.5, 6, 6.5, 7, 7.5, 8, 8.5, 9, 9.5 or 10 mgL$^{-1}$.

10. Immersion in the aqueous solution occurs for 5 to 60 minutes, depending on the type of cutting, species and phenological age of the donor tree. For example, the immersion time may be 5, 6, 7, 8, 9, 10, 15, 20, 25, 30, 35, 40, 50 or 60 minutes.

11. Alternatively, the cuttings may be smeared with talc enriched with growth regulators containing auxins (AIA, ANA or IBA, indistinctly) or cytokinins (BAP, TDZ, ZEA, KIN, 2-iP, indistinctly) or the mixture of auxins and cytokinins (AIA+BAP or AIA+TDZ or AIA+ZEA or AIA+KIN, ANA+BAP or ANA+TDZ or ANA+ZEA or ANA+KIN, IBA+BAP or IBA+TDZ or IBA+ZEA or IBA+KIN or IBA+2-iP or BAP+2iP) in a concentration range of 0 mgg$^{-1}$ to 10 mgg$^{-1}$ of each growth regulator, either simply added or mixed.

Induction of Shoots and Roots

12. The cuttings either treated with aqueous solution of regulators or smeared with enriched talcum are planted in solid substrates of organic or inorganic origin (e.g. compost, humus, guano, leaf soil, peat, sand, sawdust, coconut fiber, perlite, vermiculite, and zeolite) applied independently or in mixtures of one or more substrates at different ratios.

13. Alternatively, the cuttings can be planted in liquid substrates such as water, hydroponics solutions, nutrient solutions, culture media or simple mixtures of organic carbon sources.

14. Plastic, poly-foam, nylon, polystyrene, metal, mud, wood or any other synthetic or organic material (cellulose fiber, for example) are used for planting into solid substrates to serve as a container. Any measure of container can be used, depending on the species and the type of cutting.

15. Alternatively, a bed with any of the above-mentioned substrates can be used enabling planting the cutting directly into the substrate and generation of a bare root plant.

16. Plastic, glass, coated wood, metal, polystyrene, polyfoam, ceramic and other organic or inorganic materials can be used for planting into liquid substrates to be used as culture containers. The dimensions of the container for liquid substrate culture may be variable, depending on the species, type of cutting, phenological age of the cutting or age of the selected trees.

17. Culturing cuttings to induce sprouting and rooting is carried out indistinctly under greenhouse conditions, with controlled ambient temperature and illumination. The parameters temperature and brightness can vary in minimum and maximum ranges from 0 to 50° C. for the first one and 0 to 500 molm$^2$s$^{-1}$ for the second one.

18. The temperature of the substrate can be controlled with warm bed operated with electricity, steam, hot water, hot air, radiant floor or any system that allows handling the temperature suitable for the species under study. The minimum and maximum temperature ranges for the substrate recorded are 4 to 40° C.

19. The environmental humidity is regulated by irrigation that guarantees an environmental humidity in a range of 60-100% of ambient humidity at the height of the leaf and field capacity of the substrate. To irrigate it is recommended any irrigation system available that delivers small particles of water, in the form of mist, micro-drops, or micro-lamellas.

One embodiment of the presently claimed invention relates to the propagation of *Eucalyptus* species. For these species, hedges of plants maintained under nursery conditions were used as donors of leaf cuttings. Shoots of the season were used, semi-mature, with well expanded and developed leaves. The opposite leaves were separated at the attachment site, making a longitudinal cut through the stem. Once prepared, the cuttings were immersed for 30 minutes in aqueous base solutions of growth regulators of the cytokinin type; Zeatin, Zea (5 mgL$^{-1}$); 6-Benzylaminopurine, 6-BAP (5 mgL$^{-1}$); Thidiazuron (5 mgL$^{-1}$); and of the auxin type: indole-butyric acid at 1, 4 and 8 mgL$^{-1}$. After this time each cutting was planted in previously sterilized sand, with or without peat as a solid substrate. All the experiments were developed in a polycarbonate greenhouse, with a MIST-MATIC irrigation and pivot micro-sprinklers. The average relative humidity of the greenhouse remained at 75%±10%. The maximum light intensity recorded was 58000 lux (900-930 µmolm$^2$s$^{-1}$) and the average daily temperature on the substrate was 25.38° C.±4° C. Survival was successful in all treatments. The interaction between cytokinins and auxins favors survival, and the best levels of survival are obtained when high doses of auxins are applied to the cuttings.

Another embodiment of the presently claimed invention relates to the propagation of species from the genus *Salix* sp., (*Salicaceae*). For these species, trees growing in the field were used as donors of leaf cuttings. The plants were collected from two sampling areas. The donor trees had never been treated with growth regulators or pesticides for disease control, as they developed in their natural environment without culture activities.

Leaf cuttings were collected from shoots developed during the growing season from previously selected donor trees. The shoots were collected early in the morning to reduce their dehydration and stored in a humid chamber for transport from the field to the nursery. Once in the greenhouse, the expanded leaves were cut from the shoot, maintaining the petiole, and were inoculated at these three times: 10, 20 or 30 minutes, in a solution containing the plant growth regulators, according to the following treatments: Treatment 1 (TTI=2 mgL$^{-1}$ Indole Butyric Acid, IBA); Treatment 2 (TT2=2 mgL$^{-1}$ of Isopentenyl adenine, 2-iP); Treatment 3 (TT3=1.5 mgL$^{-1}$ of Benzylamino purine, 6-BAP); Treatment (TT4=2 mgL$^{-1}$ of IBA+1.5 mgL$^{-1}$ of 2-iP); Treatment 5 (TT5=2 mgL$^{-1}$ of IBA+1.5 mgL$^{-1}$ of 6-BAP); Treatment 6 (TT6=1.5 mgL$^{-1}$ of 2-iP+1.5 mgL$^{-1}$ of 6-BAP).

After the treatments with growth regulators (PGR), the leaves were planted in a warm bed for 90 days, to induce the formation of roots and the development of shoots. The temperature of the substrate was adjusted to 25° C. for all treatments, and the leaves were irrigated with the MIST irrigation system, maintaining greenhouse humidity between 60 and 85%. The plantation of the cuttings was made in pine sawdust and sand.

At two weeks of planting, callus formation was observed in all treatments, while rooting began to be visible three weeks after planting. The regeneration of the whole plants was visible between 45 and 60 days after planting, depending on the genotype. Each leaf produced between 1 and 3 plants per cutting. The propagation from the leaf cuttings was possible in all substrates evaluated.

Another embodiment of the presently claimed invention is the propagation of olive trees and the rootstock Atlas. For these species, leaf cuttings were collected from donor trees in fields. The olive trees were collected from a private orchard and the rootstock Atlas was collected from a private nursery.

Leaf cuttings were collected from shoots developed during the growing season from the previously selected donor trees. The shoots were collected early in the morning to reduce their dehydration and stored in a humid chamber for transport from the field to the nursery. Once in the greenhouse, the expanded leaves were cut from the shoot, maintaining the petiole, and were inoculated at these three times: 10, 20 or 30 minutes, in a solution containing plant growth regulators, according to the following treatments: Treatment 1 (TT1=5 mgL$^{-1}$ of Benzylamino purine, 6-BAP); Treatment 2 (TT2=5 mgL$^{-1}$ of IBA+5 mgL$^{-1}$ of 6-BAP); Treatment 3 (TT3=4 mgL$^{-1}$ of IBA); Treatment 4 (TT4=4 mgL$^{-1}$ of IBA+5 mgL$^{-1}$ of Zeatin); Treatment 5 (TT5=TT4=4 mgL$^{-1}$ of IBA+5 mgL$^{-1}$ of 6-BAP); Treatment 6 (TT6=8 mgL$^{-1}$ of IBA+5 mgL$^{-1}$ of Zeatin); Treatment 7 (TT7=8 mgL$^{-1}$ of IBA+5 mgL$^{-1}$ of BAP).

After the treatments with growth regulators, the leaf cuttings were planted in a warm bed for 60 days to induce the formation of shoots and rooting. The temperature of the substrate was adjusted to 25° C. for all treatments, and irrigation was performed using the MIST system with an ambient humidity that ranged between 65 and 80%. A mixture of substrates was used composed of 60% peat and 40% sand.

At two weeks of planting, callus formation was present in all treatments, while rooting appeared three weeks after planting. The evaluation of the experiment at 45 and 60 days showed the formation of roots and sprouting of the cuttings, as well as a high survival rate of the same.

Other embodiments of the presently claimed invention include the propagation of blueberry, oak, maqui, quillay, and vines, for which successful rates of 30-day survival are reported, as well as positive sprouting and rooting indicators.

This is the first time that these species are propagated under ex vitro conditions using leaf cuttings as an alternative to traditional propagation methods, under greenhouse conditions.

Description of the Invention

The presently claimed invention relates to a method for vegetative propagation of woody plants selected from the group consisting of *Eucalyptus* (*Eucalyptus* sp.), *Salix* sp., olive trees (*Oleo europaea*), rootstock Atlas (*Prunus persica* x *Prunus dulcis* x *Prunus blireiana*), blueberries (*Vaccinum corymbosum*), *Vitis vinifera, Aristotelia chilensis, Quillaja saponaria* and *Quercus ilex*, from prepared leaf cuttings, wherein the method comprises the following steps:
a) providing cuts of leaf cuttings from a donor tree,
b) immersing the prepared leaf cutting into a combination of growth regulators,
c) planting the prepared leaf cutting into a solid substrate of organic and/or inorganic origin,
d) inducing the sprouting and rooting of the prepared leaf cutting, by means of controlled ambient temperature, humidity and illumination,
wherein steps a) through d) always occur outside an in vitro environment.

In a preferred embodiment, the presently claimed invention relates to a method for vegetative propagation of woody plants selected from the group consisting of *Eucalyptus* (*Eucalyptus* sp.), *Salix* sp., olive trees (*Olea europaea*), rootstock Atlas (*Prunus persica* x *Prunus dulcis* x *Prunus blireiana*), blueberries (*Vaccinum corymbosum*), *Vitis vinifera, Aristotelia chilensis, Quillaja saponaria* and *Quercus ilex*, from prepared leaf cuttings, wherein the method comprises the following steps:
a) providing cuts of leaf cuttings from a donor tree, wherein the cuttings maintain a stem section of up to 3 cm above and below the bud,
b) immersing the prepared leaf cutting into a composition comprising at least one growth regulator, for a time period of less than or equal to 60 minutes, wherein said growth regulator is selected from auxins: AIA, ANA or indolebutyric acid (IBA) or cytokinins: 6-Benzylaminopurine (BAP, 6-BAP), Thidiazuron (TDZ), Zeatin (ZEA), KIN, 2-iP or a combination of said auxins and cytokinins, to a concentration equal to or less than 10 mgL$^{-1}$ of each,
c) planting the prepared leaf cutting into solid substrate of organic and/or inorganic origin, wherein the substrate is selected from the group consisting of compost, humus, guano, leaf earth, peat, sand, sawdust, coconut fiber, perlite, vermiculite, and zeolite, applied independently or in mixtures of one or more substrates at different ratios,
d) inducing sprouting and rooting of the prepared leaf cutting, by means of controlled ambient temperature, humidity and illumination, wherein the temperature varies in minimum and maximum ranges from 4 to 40° C., ambient humidity of 40-100% at the height of the leave, and brightness between 0 to 1000 $\mu$molm$^2$s$^{-1}$,
wherein steps a) through d) always occur outside an in vitro environment.

In a preferred embodiment, the length of the stem section is 0.5 to 3 cm above and below the bud.

In another preferred embodiment of the presently claimed invention, the combination of growth regulators is in the form of an aqueous solution or in the form of a powder comprising said regulators adsorbed onto a solid carrier.

In a further preferred embodiment, said combination of auxins and cytokinins is selected from the group consisting of AIA+BAP, AIA+TDZ, AIA+ZEA, AIA+KIN, ANA+BAP, ANA+TDZ, ANA+ZEA, ANA+KIN, ANA+2-iP, IBA+ZEA, IBA+BAP, IBA+TDZ or IBA+2-iP.

In another preferred aspect of the invention, the combination of auxin and cytokinin is selected from the group consisting of IBA+TDZ, IBA+ZEA, IBA+BAP, IBA+2-iP or BAP+2-iP.

In a further preferred embodiment, said growth regulator is in a solution having a concentration of 1.0, 1.5, 2.0, 2.5, 3.0, 3.5, 4.0, 5, 5.0, 5.5, 6.0, 6.5, 7, 7.5, 8, 8.5, 9, 9.5 or 10 mgL$^{-1}$.

In another preferred aspect of the presently claimed invention, said growth regulator is in powder form having a concentration of 1, 1.5, 2, 2.5, 3, 3.5, 4, 4.5, 5, 5.5, 6.5, 7.5, 7.5, 8, 8.5, 9, 9.5 or 10 mg/g.

In a further preferred aspect of the presently claimed invention, the prepared cutting is immersed into the solution with growth regulators for a time period of 5, 6, 7, 8, 9, 10, 15, 20, 25, 30, 35, 40, 50 or 60 minutes.

The presently claimed invention in a further embodiment relates to a method for vegetative propagation of woody plants from prepared leaf cuttings, wherein the woody plants correspond to individuals from *Eucalyptus* sp., the method comprising the following steps:

a) providing cuts of leaf cuttings from an *Eucalyptus* donor tree, wherein the cuttings comprise leaves with a bud, and maintaining a stem section of up to 3 cm above and below the bud, wherein the leaves are of a length 6 to 6.5 cm, b) immersing the prepared leaf cutting into a composition comprising at least one growth regulator, wherein said growth regulator is selected from IBA, IBA+ZEA; IBA+BAP; or IBA+TDZ for 30 minutes at a concentration equal to or less than 10 mgL$^{-1}$ of each, c) planting the prepared leaf cutting into a previously sterilized sand substrate or into a substrate mixture composed of previously sterilized peat and sand, in a tube production system or on a naked root, in a warm bed, d) inducing sprouting and rooting of the prepared leaf cutting, by means of controlled ambient temperature, humidity and illumination, wherein the temperature varies in minimum and maximum ranges from 21 to 29° C., ambient humidity of 65-85%, and the minimum brightness during the day is 15 lux and the maximum is 930 μmolm$^2$s$^{-1}$, wherein steps a) through d) always occur outside an in vitro environment.

In a preferred embodiment of the method for vegetative propagation of woody plants from prepared leaf cuttings, wherein the woody plants correspond to individuals from *Eucalyptus* sp, in step a), the leaf cutting cuts correspond to season shoots, wherein the shoots are semi-mature with expanded and developed leaves.

In another preferred embodiment of the method for vegetative propagation of woody plants from prepared leaf cuttings, wherein the woody plants correspond to individuals from *Eucalyptus* sp, in step a), the leaf cutting cuts consist of a longitudinal section of the stem, wherein a stem portion is maintained between 2-3 cm from the base of the leaf towards the bottom of the stem.

In another preferred embodiment of the method for vegetative propagation of woody plants from prepared leaf cuttings, wherein the woody plants correspond to individuals from *Eucalyptus* sp, in step b), combinations of Zea (5 mgL$^{-1}$); BAP (5 mgL$^{-1}$); and TDZ (5 mgL$^{-1}$) are used with IBA at 1, 4 and 8 mgL$^{-1}$.

In another preferred embodiment of the method for vegetative propagation of woody plants from prepared leaf cuttings, wherein woody plants correspond to individuals from *Eucalyptus* sp, in step c), the cutting from b) is planted in a plant production system in a warm bed on a naked root or in tubes.

In another preferred embodiment of the method for vegetative propagation of woody plants from prepared leaf cuttings, wherein the woody plants correspond to individuals from *Eucalyptus* sp, the substrate used is previously sterilized sand.

In another preferred embodiment of the method for vegetative propagation of woody plants from prepared leaf cuttings, wherein the woody plants correspond to individuals from *Eucalyptus* sp, in step (c), the cutting from (b) is planted in a warm bed on a bare root or in a warm bed in a tube, wherein the warm bed is maintained at a stable temperature of 24° C.

The present invention in a further embodiment relates to a method for vegetative propagation of woody plants from prepared leaf cuttings, wherein the woody plants correspond to individuals from *Salix* sp., wherein the method comprises the following steps:

a) providing cuts of leaf cuttings from a *Salix* sp. donor tree, wherein cuts are prepared by maintaining a stem section between 0.5 and 3 cm above and below the bud, b) immersing the prepared leaf cutting into an aqueous solution containing growth regulators selected from the group consisting of IBA, 2-iP, BAP, IBA+2-iP; IBA+BAP; or BAP+2-iP in a concentration range of up to 10 mgL$^{-1}$ of each growth regulator, either simply added or mixed, wherein immersion in the aqueous solution occurs for 10 minutes, c) planting the prepared leaf cutting into a solid substrate of organic and/or inorganic origin, wherein the substrate is selected from the group consisting of sand, sawdust, compost, applied independently or in mixtures of one or more substrates at different ratios, d) inducing sprouting and rooting of the prepared leaf cutting, by means of controlled ambient temperature, humidity and illumination, wherein the temperature varies in minimum and maximum ranges from 4 to 40° C., ambient humidity of 65-85% and brightness between 0 to 930 μmolm$^2$s$^{-1}$, wherein steps a) through d) always occur outside an in vitro environment.

The presently claimed invention in a further embodiment relates to a method for vegetative propagation of woody plants from prepared leaf cuttings, wherein the woody plants correspond to individuals from olive trees (*Oleo europaea*), wherein the method comprises the following steps:

a) providing cuts of leaf cuttings from a donor olive tree, wherein the cuts are prepared by maintaining a stem section between 0.5 and 3 cm above and below the bud, b) immersing the prepared leaf cutting into an aqueous solution containing growth regulators, selected from the group containing BAP, IBA+BAP or IBA+ZEA in a concentration range of up to 10 mgL$^{-1}$ of each growth regulator, either simply added or mixed, wherein the immersion in the aqueous solution occurs for 10 minutes, c) planting the prepared leaf cutting into a solid substrate of organic and/or inorganic origin, wherein the substrate is selected from the group consisting of peat, sand, applied independently or in mixtures of one or more substrates at different ratios, d) inducing sprouting and rooting of the prepared leaf cutting, by means of controlled ambient temperature, humidity and illumination, wherein the temperature varies in minimum and maximum ranges from 4 to 40° C., ambient humidity of 65-85% and brightness between 0 to 930 molm$^2$s$^{-1}$, wherein steps a) through d) always occur outside an in vitro environment.

The presently claimed invention in a further embodiment relates to a method for vegetative propagation of woody plants from prepared leaf cuttings, wherein the woody plants correspond to individuals from Atlas (*Prunus persica* x *Prunus dulcis* x *Prunus blireiana*), wherein the method comprises the following steps:

a) providing cuts of leaf cuttings from a donor Atlas tree, wherein the cuts are prepared by maintaining a stem section between 0.5 and 3 cm above and below the bud, b) immersing the prepared leaf cutting into an aqueous solution containing growth regulators, selected from the group containing BAP, IBA+BAP or IBA+ZEA in a concentration range of up to 10 mgL$^{-1}$ of each growth regulator, either simply added or mixed, wherein the immersion in the aqueous solution occurs for 10 minutes, c) planting the prepared leaf cutting into a solid substrate of organic and/or inorganic origin, wherein the substrate is selected from the group consisting of peat, sand, applied independently or in mixtures of one or more substrates at different ratios,
d) inducing sprouting and rooting of the prepared leaf cutting, by means of controlled ambient temperature, humidity and illumination, wherein the temperature varies in minimum and maximum ranges from 4 to 40° C., ambient humidity of 65-85% and brightness between 0 to 930 $\mu molm^2s^{-1}$,
wherein steps a) through d) always occur outside an in vitro environment.

In another further embodiment the presently claimed invention relates to a method for vegetative propagation of woody plants from prepared leaf cuttings, wherein the woody plants correspond to individuals from blueberries (*Vaccinum colymbosum*), *Vitis vinifera, Aristotelia chilensis, Quillaja saponaria* or *Quercus ilex*, wherein the method comprises the following steps:
a) providing cuts of leaf cuttings from a donor tree of the species blueberry (*Vaccinum corymbosum*), *Vitis vinifera, Aristotelia chilensis, Quillaja saponaria* or *Quercus ilex*, wherein the cuts are prepared maintaining a stem section of up to 3 cm above and below the bud,
b) immersing the prepared leaf cutting into a composition comprising at least one growth regulator, wherein said growth regulator is selected from IBA, IBA+ZEA; IBA+BAP; or IBA+TDZ for 10 minutes at a concentration equal to or less than 10 $mgL^{-1}$ of each,
c) planting the prepared leaf cutting into a previously sterilized sand substrate or into a substrate mixture composed of previously sterilized sand and peat,
d) inducing sprouting and rooting of the prepared leaf cutting, by means of controlled ambient temperature, humidity and illumination, wherein the temperature varies in minimum and maximum ranges from 21 to 29° C., ambient humidity of 65-85%, and the maximum brightness is 930 $\mu molm^2s^{-1}$,
wherein steps a) through d) always occur outside an in vitro environment.

VI. EXAMPLES

Example 1: Experimental Results for *Eucalyptus* Spp. by Leaf Cuttings

*Eucalyptus* Nitens 1.1. Experimental Conditions 1.1.2. Preparation of Cuttings

Leaf cuttings were prepared from hedgerows kept under nursery conditions. Shoots of the season were used, semi-mature, with well expanded and developed leaves. The leaves had an average length of 6.5 cm. Leaves welded to a stem with a minimum diameter of 7 mm were used. The opposite leaves were separated at the attachment site, making a longitudinal cut through the stem and maintaining a 2-3 cm stem portion from the base of the leaf towards the bottom of the stem.

1.1.3. Hormonal Treatments

Once prepared, the cuttings were immersed into aqueous-based hormone solutions of growth regulators of the cyto-kinin type: Zeatine, Zea (5 $mgL^{-1}$); 6-Benzylaminopurine, 6-BAP (5 $mgL^{-1}$); Thidiazuron (5 $mgL^{-1}$); and of the auxin type: indole-butyric acid at 1, 4 and 8 $mgL^{-1}$. The effect of the single application of each type of regulator and the combination of the cytokinins with auxin, as shown in Table 1, was evaluated.

TABLE 1

Hormonal treatments evaluated for the propagation of *E. nitens* by welded leaf cuttings.

| Auxin<br>IBA | Cytokinins | | | |
|---|---|---|---|---|
| | 0 | TDZ<br>(5 $mgL^{-1}$) | Zea<br>(5 $mgL^{-1}$) | BAP<br>(5 $mgL^{-1}$) |
| 0 | T12 | T13 | T14 | T15 |
| 1 $mgL^{-1}$ | T16 | T17 | T18 | T19 |
| 4 $mgL^{-1}$ | T20 | T21 | T22 | T23 |
| 8 $mgL^{-1}$ | T24 | T25 | T26 | T27 |

The cuttings were immersed into each growth regulator solution for 30 minutes under greenhouse conditions. After this time each of the cuttings was planted in previously sterilized sand, with or without peat as solid substrate. For example, cuttings can be planted in a substrate mixture composed of 60% peat and 40% sand. The cuttings were grown in plastic tubes on a warm bed with or without sand, and bare root on any of the solid substrates mentioned.

1.1.4. Plant Production and Environmental Conditions

Each of the growth regulator treatments was evaluated. All experiments were carried out in a polycarbonate greenhouse, with a MIST-A-MATIC irrigation and pivot micro-sprinklers. The average relative humidity (14420 measurements) of the greenhouse was 75%±10%, with a registered minimum of 38% and a registered maximum of 90%. The minimum light intensity recorded was 0 with a maximum value of 58000 lux (900-930 $\mu molm^2s^{-1}$) (18793 observations); while the average daily temperature on the substrate was 25.38±4° C. (14420 observations), with a minimum recorded of 17° C. and a maximum recorded of 35° C.

1.1.5. Experimental Design and Statistical Analysis

Three replicates of each treatment were performed with 15 welded leaf cuttings per replicate. Likewise, the type of cutting with welded leaf was compared to the micro-cutting (mini-cutting) prepared according to the current productive practice, i.e.: a micro-cutting of approximately 4-6 cm, with the two leaves welded and cut in half.

The effect of treatments and the welded leaf cutting on the variables related to propagation efficiency were evaluated: % sprouting, % rooting, % survival; height of the shoots. A single evaluation was performed at 60 days of the experiment.

The data were processed with the BioSTATS 3.5 statistical package. To determine if there were any differences between treatments, a Kruskal-Wallis test ($p<0.05$) was performed.

1.2. Results 1.2.1. Survival of Welded Cuttings

Survival was successful in all treatments. The welded leaf cuttings showed better survival rates in all treatments as compared to traditional micro-cuttings.

It is observed that the interaction between cytokinins and auxins favors survival and that the best levels of survival are obtained when high doses of auxins are applied to the cuttings (FIG. 2).

1.2.2. Sprouting from Welded Cuttings

Sprouting of welded leaf cuttings presented a better response in those treatments supplemented with both growth regulators, but with high auxin levels. On the other hand, the cuttings of welded buds keep only one of the buds, so in terms of efficiency this type of cutting is capable of rescuing the latent bud at levels similar to the lateral buds, although this implies a higher metabolic cost to the tissue.

The best treatments (FIG. 3) to induce sprouting in the production system were T26=IBA (8 mgL$^{-1}$)+Zea (5 mgL$^{-1}$) and T27=IBA (8 mgL$^{-1}$)+BAP mgL$^{-1}$), with more than 50% sprouting. It is noteworthy that in these treatments the sprouting of the traditional micro-cuttings was significantly lower.

1.2.3. Height of Shoots

The welded leaf cuttings showed a higher height of the shoots than the micro-cuttings in the system of propagation by mini-cuttings. At 60 days after the evaluation the differences are significant, as shown in FIG. 4.

The height of the shoots generated from both types of cuttings was different (FIG. 5). The treatments induced significant differences for the welded leaves and not for the micro-cuttings.

The best treatments for cuttings with welded leaves were treatment T22=IBA (4 mgL$^{-1}$)+Zea (5 mgL$^{-1}$) and treatment T27=IBA (8 mgL$^{-1}$)+BAP (5 mgL$^{-1}$), with average heights of their shoots higher than 60 mm.

1.2.4. Rooting of Cuttings with Welded Leaves

The morphometric rooting variable is critical in any asexual propagation system and is especially important in woody plants. Usually, the initial sprouting of the part uses the accumulated reserves in the stem and the buds, but once these reserves are finished the plant uses the metabolic energy produced by photosynthesis. However, if there is no synchrony between the development of the shoots and the generation of roots, the plant will not have a supply of water and nutrients to perform photosynthesis and the cutting ends up aborting the shoots produced. This can lead to the death of plants. For many specialists in plant propagation this is the most important variable to meet. The rooting of the cuttings is shown in FIG. 6.

In the evaluated production system, mini-cuttings rooted above 12% in treatments T22=IBA (4 mgL$^{-1}$)+Zea (5 mgL$^{-1}$) and T24=IBA (8 mgL$^{-1}$).

In the case of welded leaf cuttings the results were higher, the best treatment was T24=IBA (8 mgL$^{-1}$), which induced a 40% rooting. However, other treatments also induced roots over 30%, being statistically equal to the T24 treatment, as treatments T14=Zea (5 mgL$^{-1}$), T23=IBA (4 mgL$^{-1}$)+BAP (5 mgL$^{-1}$); T27=IBA (8 mgL$^{-1}$)+BAP (5 mgL$^{-1}$). The overall development of the roots in the welded leaf cuttings was equally better in terms of their length and vigor (FIG. 7). The described assays were further performed on *Eucalyptus globulus* as well as on hybrids of *Eucalyptus* species, with results similar to those described herein.

Example 2: Experimental Results for *Salicaceae* Species by Leaf Cuttings

2.1. Experimental Conditions

2.1.2. Preparation of Cuttings

The efficiency of the technology in the species of the family *Salicaceae Salix humboltiana* and *Salix caprea* was evaluated. Leaf cuttings from plants were used. Cuttings of leaves of the season were used, juvenile, well developed, expanded and without signs of maturity. The leaves had a minimum length from the base to the apex of 10 cm.

Two types of leaves were evaluated: leaves welded to the stem and non-welded leaves. Likewise, the effect of the leaf preparation was evaluated, considering them as whole leaves subjected to cuts of their lateral, abaxial and apical ends, as shown in FIG. 1. The leaves welded to the stem were prepared maintaining a stem section above and below the bud between 0.5 and 3 cm.

2.1.3. Hormonal Treatments

Once prepared, the cuttings were immersed into aqueous-based hormonal solutions, according to the following treatments: Treatment 1 (TT1=2 mgL$^{-1}$ of Indolbutyric Acid, IBA); Treatment 2 (TT2=2 mgL$^{-1}$ of Isopentenyl Adenine, 2-iP); Treatment 3 (TT3=1.5 mgL$^{-1}$ of Benzylamino Purine, 6-BAP); Treatment 4 (TT4=2 mgL$^{-1}$ of IBA+1.5 mgL$^{-1}$ of 2-iP); Treatment 5 (TT5=2 mgL$^{-1}$ of IBA+1.5 mgL$^{-1}$ of 6-BAP); Treatment 6 (TT6=1.5 mgL$^{-1}$ of 2-iP+1.5 mgL$^{-1}$ BAP). The cuttings were immersed into each growth regulator solution during any of the following times: 10, 20 or 30 minutes, under greenhouse environmental conditions. After this time each of the cuttings was planted in their respective plant production system.

2.1.4. Type of Plant Production System and Environmental Conditions

Each of the growth regulator treatments was evaluated in a plant production system with a substrate comprising sand or sawdust and compost. For all treatments, the substrates were sterilized by slow cooking for 6 hours at 160° C.

All the experiments were developed in a polycarbonate greenhouse, with a MISTMATIC irrigation and pivot micro-sprinklers. The greenhouse conditions complied with those established in Example 1.

The cuttings were grown under a bare root production system in a warm bed where the average daily temperature of the substrate was 25.38±4° C. (14420 observations), with a minimum recorded of 17° C. and a maximum recorded of 35° C.

2.1.5. Experimental Design and Statistical Analysis

Three replicates of each treatment were performed with 10 leaf cuttings per replicate. The effect of treatments and the welded leaf cuttings on the variables related to propagation efficiency were evaluated: % sprouting, % rooting, % survival. A single evaluation was performed 30 days after the experiment was set up.

The data were processed with the statistical package BioSTATS 3.5. To determine if there were any differences between treatments, a Kruskal-Wallis test (p<0.05) was performed.

2.2. Results

2.2.1. Survival of Leaf Cuttings

A survival rate was obtained ranging from 63% to 100% in all treatments evaluated. A significant effect of the type of substrate on survival was not observed in either species.

2.2.2 Sprouting

At 30 days sprout differentiation was scarce, with a significant effect of growth regulator treatments on *S. humboltiana* and the type of substrate for *S. caprea* (FIG. 8). In sand substrate, the best hormonal treatments for *S. humboltiana* were TT3 (63.3%), TT5 (76.7%) and TT6 (76.7%) and for *S. caprea* TT3 was 23.3%.

The cuttings of *S. humboltiana* grown in sawdust substrate responded better to treatments TT4 and TT6, with 73.3%. In this type of substrate, the *S. caprea* species did not show significant differences in the differentiation of the shoots with a 3.3% emission.

2.2.3. Rooting

In general, the rooting of both species occurred in all evaluated treatments. For none of them, a significant effect of the substrate type on rooting was found, although the *S. caprea* species maintained a more stable behavior in both substrates. The data obtained demonstrate a strong tendency of both species to develop first the rooting events than those of sprouting, especially in the *S. caprea* species. For *S. caprea*, no effect of growth regulators on rooting was observed in any of the two types of substrates evaluated, fluctuating between 90 and 100% efficiency. In contrast, the *S. humboltiana* species was significantly influenced by the treatment of growth regulators in both types of substrates. In sand, rooting efficiency fluctuated between 46% and 90%, with treatments TT5 (2 mgL$^{-1}$ of IBA+1.5 mgL$^{-1}$ of 6-BAP) and TT6 (1.5 mgL$^{-1}$ of 2-iP+1.5 mgL$^{-1}$ of BAP) reaching the highest values. For the sawdust substrate, rooting fluctuated between 60% and 96.7%. with the treatment TT5 (2 mgL$^{-1}$ of IBA+1.5 mgL$^{-1}$ of 6-BAP) reaching the maximum value. At 30 days, the cuttings generated between 1 and 2 roots each, (FIG. 9).

Example 3: Experimental Results for Olive Trees and Rootstock Atlas by Leaf Cuttings

3.1. Experimental Conditions

3.1.2. Preparation of Cuttings

The efficiency of the technology in the species of woody olive trees (*Olea europaea*) and the rootstock Atlas (*Prunus persica* x *Prunus dulcis* x *Prunus blireiana*) of wide use in the fruit agroindustry was evaluated. Cuttings of leaves of the season, juvenile, well developed, expanded and without signs of maturity, from field plants were used. The leaves had a minimum length from the base to the apex of 10 cm. Two types of leaves were evaluated: leaves welded to the stem and non-welded leaves. Likewise, the effect of the leaf preparation was evaluated, considering them as whole leaves subjected to cuts of their lateral, abaxial and apical ends, as shown in FIG. 1. The leaves welded to the stem were prepared maintaining a stem section above and below the bud of between 0.5 and 3 cm.

3.1.3. Hormonal Treatments

Once prepared, the cuttings were immersed into aqueous-based hormonal solutions, according to the following treatments: Treatment 1 (TT1=5 mgL$^{-1}$ of 6-BAP); Treatment 2 (TT2=5 mgL$^{-1}$ of IBA+5 mgL$^{-1}$ of 6-BAP); Treatment 3 (TT3=4 mgL$^{-1}$ of 6-BAP); Treatment 4 (TT4=4 mgL$^{-1}$ of IBA+5 mgL$^{-1}$ of Zeatin); Treatment 4 (TT4=4 mgL$^{-1}$ of IBA+5 mgL$^{-1}$ of 6-BAP); Treatment 5 (TT5=8 mgL$^{-1}$ of IBA+5 mgL$^{-1}$ of Zeatin); Treatment 6 (TT6=8 mgL$^{-1}$ of IBA+5 mgL$^{-1}$ of BAP).

The cuttings were immersed into each growth regulator solution during any of the following times: 10, 20 or 30 minutes, under greenhouse environmental conditions. After this time each of the cuttings was planted in their respective plant production system.

3.1.4. Type of Plant Production System and Environmental Conditions

Each of the growth regulator treatments was evaluated in a naked root system with a substrate consisting of 60% peat and 40% sand. The substrates were sterilized for all treatments by slow cooking for 6 hours at 160° C.

The cuttings were grown under a bare root production system in a warm bed where the average daily temperature of the substrate was 25.38° C.±4° C. (14420 observations), with a minimum recorded of 17° C. and a maximum recorded of 35° C.

All experiments were carried out in a polycarbonate greenhouse, with a MIST-A-MATIC irrigation and pivot micro-sprinklers. The greenhouse conditions complied with those established in Example 1.

3.1.5. Experimental Design and Statistical Analysis

Three replicates of each treatment were performed with 10 leaf cuttings per replicate. The effect of the treatments and welded leaf cuttings on the variables related to propagation efficiency were evaluated: % sprouting, % rooting, % survival. A single evaluation was performed 45 days after the experiment was set up.

The data were processed with the statistical package BioSTATS 3.5. To determine if there were any differences between treatments, a Kruskal-Wallis test ($p<0.05$) was performed.

3.2. Results

3.2.1. Survival of Leaf Cuttings

For olive trees, the survival rate ranged from 46.7% to 100% in all evaluated treatments, whereas in the rootstock Atlas survival ranged from 60% to 90% (FIG. 10).

In both species, growth regulators had a significant influence on survival over TT1 and TT3 treatments (FIG. 11). Except for these two treatments, the rest of the combinations tested did not present significant differences, so there is a fairly wide range of treatments with the same efficiency.

3.2.2. Sprouting

At 45 days the differentiation of the shoots was evident, with a significant effect of growth regulator treatments on both species (FIG. 11). For olive trees, the best treatments were TT6 and TT7, with almost 90% sprouting (FIG. 11). In the case of Atlas, the best treatments were TT5, TT6 and TT7. At 45 days, the shoots were well developed.

3.2.3. Rooting

The rooting of both species took place in all treatments evaluated with values ranging from 20% to 63% and from 33% to 50% for olive trees and Atlas, respectively. In the case of olive trees, the treatments TT4, TT5, TT6, TT7 did not differ from each other and were the best. In Atlas, the best treatments were TT2, TT5 and TT6. Each cutting issued 1 or 2 roots and no marked effect of the treatment on the number of roots issued was observed (FIG. 12).

Example 4: Results with Other Species

The methodology of the presently claimed invention has proven to be further effective in other species of woody plants, including blueberries, oak, maqui, quillay, vines. For these species, the following table (Table 3) is provided with the results of their evaluation. For all of them the conditions of Example 1 were reproduced.

TABLE 3

Effectiveness of propagation technology by leaf cuttings in different species of woody plants

| Species | Survival at 30 days | Srouting | Rooting |
| --- | --- | --- | --- |
| Blueberries (*Vaccinum corymbosum*) | + | + | + |
| Oak (*Quercus ilex*) | + | − | + |
| M aqui (*Aristotelia chilensis*) | + | + | + |
| Quillay (*Quillaja saponaria*) | + | + | + |
| Vin es (*Vitis vinifera*) | + | + | + |

REFERENCES

AU 2011244984
AU 200138822
Jaenicke, H., and Beniest, J. 2002. Vegetative Tree Propagation in Agroforestry, Training Guidelines and References. Unit 1: Introduction to vegetative tree propagation, pp. 1-15; Unit 3: Cuttings, pp. 55-71. International Centre for Research in Agroforestry, Nairobi, Kenya. ISBN 92 9059 1439.
Toenyan, N., Arnoldi, T., Mijares, M., Havill, S. 2015. Cutting Propagation Methods for PNW Native Shrubs and Trees.
Douglas, S. M. 2015. Basic Techniques for Propagating Plants.
Navarrete Luna, M., Vargas-Hernandez, J. 2005. Propagación asexual de clones de *Eucaliptus camaldulensis* Dehnh utilizando Radix en diferentes concentraciones [Asexual propagation of *Eucaliptus camaldulensis* Dehnh clones using Radix at different concentrations]. Revista Chapingo Serie Ciencias Forestales y del Ambiente 11 (2): 111-116.
Chaperone, H. 1983. Clonal Propagation of *Eucalyptus* by Cuttings in France. Presented at the Workshop on *Eucalyptus* in California, Jun. 14-16, 1983, Sacramento, Calif.
Titon, M., Xavier, A., Campos Otoni, W. 2006. Clonal propagation of *Eucalyptus grandis* using the mini-cutting and micro-cutting techniques. Scientia Forestalis 71: 109-117.
Francisco de Assis, T., Fett-Neto, A. G., Couto Alfenas, A. 2004. Current techniques and prospects for the clonal propagation of hardwoods with emphasis on *Eucalyptus*. In: Plantation Forest Biotechnology for the 21st Century, 2004; pp. 303-333. Editors: Christian Walter and Mike Carson. Research Signpost 37/661 (2), Fort P.O., Trivandrum-695 023, Kerala, India. ISBN: 81-7736-228-3.
Hartman, H. T., Rester, D. E., Davies, F. T., Geneve, R. L. 1997. Plant Propagation: Principles and Practices. Six Edition. Chapter 10 The Biology of Propagation by Cuttings, pp. 282-285; Chapter 11 Techniques of Propagation by cuttings, pp. 329-344. Prentice Hall International, New Jersey, USA. ISBN: 0-13-261488-X.

The invention claimed is:

1. A method for vegetative propagation of woody plants selected from the group consisting of Eucalyptus (*Eucalyptus* sp.), *Salix* sp., olive tree (*Olea europaea*), rootstock Atlas (*Prunus persica* x *Prunus dulcis* x *Prunus blireiana*), blueberries (*Vaccinum corymbosum*), *Vitis vinifera*, *Aristotelia chilensis*, *Quillaja saponaria* and *Quercus ilex*, from prepared leaf cuttings, wherein in that the method comprises the following steps:
   a) providing cuts of leaf cuttings from a donor tree,
   b) immersing the prepared leaf cutting into a combination of growth regulators,
   c) planting the prepared leaf cutting into a solid substrate of organic and/or inorganic origin, d) inducing sprouting and rooting of the prepared leaf cutting, by controlling ambient temperature, humidity and illumination,
wherein steps a) through d) always occur outside an in vitro environment.

2. A method for vegetative propagation of woody plants selected from the group consisting of Eucalyptus (*Eucalyptus* sp.), *Salix* sp., olive tree (*Olea europaea*), rootstock Atlas (*Prunus persica* x *Prunus dulcis* x *Prunus blireiana*), blueberries (*Vaccinum corymbosum*), *Vitis vinifera*, *Aristotelia chilensis*, *Quillaja saponaria* and *Quercus ilex*, from prepared leaf cuttings, wherein in that the method comprises the following steps
   a) providing cuts of leaf cuttings from a donor tree, where the cuttings maintain a stem section of up to 3 cm above and below the bud,
   b) immersing the prepared leaf cutting into a composition comprising at least one growth regulator, for a time period of less than or equal to 60 minutes, wherein said growth regulator is selected from auxins: AIA, ANA or indole-butyric acid (IBA) or cytokinins: 6-Benzylaminopurine (BAP, 6-BAP), Thidiazuron (TDZ), Zeatin (ZEA), KIN, 2-iP or a combination of said auxins and cytokinins, at a concentration equal to or lower than 10 $mgL^{-1}$ of each,
   c) planting the prepared leaf cutting into a solid substrate of organic and/or inorganic origin, where the substrate is selected from the group consisting of compost, humus, guano, leaf earth, peat, sand, sawdust, coconut fiber, perlite, vermiculite, and zeolite, applied independently or in mixtures of one or more substrates at different ratios,
   d) inducing sprouting and rooting of the prepared leaf cutting, by controlling ambient temperature, humidity and illumination, where the temperature varies in minimum and maximum ranges from 4 to 40° C., ambient humidity of 40-100% at the height of the leaf, and brightness between 0 to 1000 $\mu molm^2 s^{-1}$,
wherein steps a) through d) always occur outside an in vitro environment.

3. The method for vegetative propagation of woody plants from prepared leaf cuttings according to claim 2, wherein in that the length of the stem section is from 0.5 to 3 cm above and below the bud.

4. The method for vegetative propagation of woody plants from prepared leaf cuttings according to claim 2, wherein in that said combination of growth regulators is in the form of an aqueous solution or in the form of powder comprising said regulators adsorbed in a solid carrier.

5. The method for vegetative propagation of woody plants from prepared leaf cuttings according to claim 2, wherein in that said combination of auxins and cytokinins is selected from the group consisting of AIA+BAP, AIA+TDZ, AIA+ZEA, AIA+KIN, ANA+BAP, ANA+TDZ, ANA+ZEA, ANA+KIN, ANA+2-iP, IBA+ZEA, IBA+BAP, IBA+TDZ or IBA+2-iP.

6. The method for vegetative propagation of woody plants from prepared leaf cuttings according to claim 5, wherein in that the combination of auxin and cytokinin is selected from the group consisting of IB A+TDZ, IBA+ZEA, IBA+BAP, IBA+2-iP or BAP+2-iP.

7. The method for vegetative propagation of woody plants from prepared leaf cuttings according to claim 5, wherein in that said growth regulator is in a solution having a concentration of 1.0, 1.5, 2.0, 2.5, 3.0, 3.5, 4.0, 4.5, 5.0, 5.5, 6.0, 6.5, 7, 7.5, 8, 8.5, 9, 9.5 or 10 $mgL^{-1}$.

8. The method for vegetative propagation of woody plants from prepared leaf cuttings according to claim 5, wherein in that said growth regulator is in powder form having a concentration of 1, 1.5, 2, 2.5, 3, 3.5, 4, 4.5, 5, 5.5, 6, 6.5, 7, 7.5, 8, 8.5, 9, 9.5 or 10 mg/g.

9. The method for vegetative propagation of woody plants from prepared leaf cuttings according to claim 2, wherein in that the prepared cutting is immersed in the solution with growth regulators for a time period of 5, 6, 7, 8, 9, 10, 15, 20, 25, 30, 35, 40, 50 or 60 minutes.

10. A method for vegetative propagation of woody plants from prepared leaf cuttings, wherein the woody plants correspond to individuals from *Eucalyptus* sp., wherein in that the method comprising the following steps:
   a) providing cuts of leaf cuttings from an *Eucalyptus* donor tree, where the cuttings comprise leaves with a bud, and maintaining a stem section of up to 3 cm above and below the bud, where the leaves are of a length 6 to 6.5 cm,
   b) immersing the prepared leaf cutting into a composition comprising at least one growth regulator, wherein said growth regulator is selected from IBA, IBA+ZEA; IBA+BAP; or IBA+TDZ for 30 minutes at a concentration equal to or less than 10 $mgL^{-1}$ of each,
   c) planting the prepared leaf cutting into a previously sterilized sand substrate or in a substrate mixture composed of previously sterilized peat and sand, in a tube production system or on a naked root, in a warm bed,
   d) inducing sprouting and rooting of the prepared leaf cutting, by controlling ambient temperature, humidity and illumination, where the temperature varies in minimum and maximum ranges from 21 to 29° C., ambient humidity of 65-85%, and the minimum brightness during the day is 15 lux and the maximum is 930 $\mu molm^2 s^{-1}$,
wherein steps a) through d) always occur outside an in vitro environment.

11. The method according to claim 10, wherein in that in step a) the leaf cutting cuts correspond to season shoots, where the shoots are semi-mature with expanded and developed leaves.

12. The method according to claim 10, wherein in that in step a) the leaf cutting cuts consist of a longitudinal section of the stem, where a stem portion is maintained between 2-3 cm from the base of the leaf towards the bottom of the stem.

13. The method according to claim 10, wherein in that in step b) combinations of Zea (5 $mgL^{-1}$); BAP (5 $mgL^{-1}$); and TDZ (5 $mgL^{-1}$) with IBA at 1, 4 and 8 $mgL^{-1}$ are used.

14. The method according to claim 10, wherein in that in step c) the cutting from b) is planted in a plant production system in a warm bed on a naked root or in tubes.

15. The method according to claim 14, wherein in that the substrate used is previously sterilized sand.

16. The method according to claim 15, wherein in that in step (c) the cutting from (b) is planted in a warm bed on a bare root or in a warm bed in a tube, wherein the warm bed is maintained at a stable temperature of 24° C.

17. A method for vegetative propagation of woody plants from prepared leaf cuttings, wherein the woody plants correspond to individuals from *Salix* sp., wherein in that the method comprises the following steps:
   a) providing cuts of leaf cuttings from a *Salix* sp. donor tree, where cuts are prepared by maintaining a stem section between 0.5 and 3 cm above and below the bud,
   b) immersing the prepared leaf cutting into an aqueous solution containing growth regulators selected from the group consisting of IBA, 2-iP, BAP, IBA+2-iP; IBA+BAP; or BAP+2-iP in a concentration range of up to 10 $mgL^{-1}$ of each growth regulator, either simply added or mixed, where immersion in the aqueous solution occurs for 10 minutes,
   c) planting the prepared leaf cutting into a solid substrate of organic and/or inorganic origin, wherein the substrate is selected from the group consisting of sand, sawdust, compost, applied independently or in mixtures of one or more substrates at different ratios,
   d) inducing sprouting and rooting of the prepared leaf cutting, by controlling ambient temperature, humidity and illumination, where the temperature varies in minimum and maximum ranges from 4 to 40° C., ambient humidity of 65-85% and brightness between 0 to 930 $\mu molm^2 s^{-1}$, wherein steps a) through d) always occur outside an in vitro environment.

18. A method for vegetative propagation of woody plants from prepared leaf cuttings, wherein the woody plants correspond to individuals from olive trees (*Olea europaea*), wherein in that the method comprises the following steps:
   a) providing cuts of leaf cuttings from a donor olive tree, where the cuts are prepared by maintaining a stem section between 0.5 and 3 cm above and below the bud,
   b) immersing the prepared leaf cutting into an aqueous solution containing growth regulators, selected from the group containing BAP, IBA+BAP or IBA+ZEA in a concentration range of up to 10 $mgL^{-1}$ of each growth regulator, either simply added or mixed, where the immersion in the aqueous solution occurs for 10 minutes,
   c) planting the prepared leaf cutting into a solid substrate of organic and/or inorganic origin, wherein the substrate is selected from the group consisting of peat, sand, applied independently or in mixtures of one or more substrates at different ratios,
   d) inducing sprouting and rooting of the prepared leaf cutting, by controlling ambient temperature, humidity and illumination, where the temperature varies in minimum and maximum ranges from 4 to 40° C., ambient humidity of 65-85% and brightness between 0 to 930 molm²s⁻¹, wherein steps a) through d) always occur outside an in vitro environment.

19. A method for vegetative propagation of woody plants from prepared leaf cuttings, wherein the woody plants correspond to individuals from Atlas (*Prunus persica* x *Prunus dulcis* x *Prunus blireiana*), wherein in that the method comprises the following steps:
   a) providing cuts of leaf cuttings from a donor Atlas tree, where the cuts are prepared by maintaining a stem section between 0.5 and 3 cm above and below the bud,
   b) immersing the prepared leaf cutting into an aqueous solution containing growth regulators, selected from the group containing BAP, IBA+BAP or IBA+ZEA in a concentration range of up to 10 mgL⁻¹ of each growth regulator, either simply added or mixed, where the immersion in the aqueous solution occurs for 10 minutes,
   c) planting the prepared leaf cutting into a solid substrate of organic and/or inorganic origin, wherein the substrate is selected from the group consisting of peat, sand, applied independently or in mixtures of one or more substrates at different ratios,
   d) inducing sprouting and rooting of the prepared leaf cutting, by controlling ambient temperature, humidity and illumination, where the temperature varies in minimum and maximum ranges from 4 to 40° C., ambient humidity of 65-85% and brightness between 0 to 930 molm²s⁻¹, wherein steps a) through d) always occur outside an in vitro environment.

20. A method for vegetative propagation of woody plants from prepared leaf cuttings, wherein the woody plants correspond to individuals from blueberries (*Vaccinum corymbosum*), *Vitis vinifera, Aristotelia chilensis, Quillaja saponaria* or *Quercus ilex*, wherein in that the method comprises the following steps:
   a) providing cuts of leaf cuttings from a donor tree of the species blueberry (*Vaccinum corymbosum*), *Vitis vinifera, Aristotelia chilensis, Quillaja saponaria* or *Quercus ilex*, where the cuts are prepared maintaining a stem section of up to 3 cm above and below the bud,
   b) immersing the prepared leaf cutting into a composition comprising at least one growth regulator, wherein said growth regulator is selected from IBA, IBA+ZEA; IBA+BAP; or IBA+TDZ for 10 minutes at a concentration equal to or less than 10 mgL⁻¹ of each,
   c) planting the prepared leaf cutting into a previously sterilized sand substrate or into a substrate mixture composed of previously sterilized sand and peat,
   d) inducing sprouting and rooting of the prepared leaf cutting, by controlling ambient temperature, humidity and illumination, where the temperature varies in minimum and maximum ranges from 21 to 29° C., ambient humidity of 65-85%, and the maximum brightness is 930 μmolm²s⁻¹, wherein steps a) through d) always occur outside an in vitro environment.

* * * * *